United States Patent [19]

Quesnell, Jr.

[11] 4,317,211
[45] Feb. 23, 1982

[54] MANCHESTER CODE DECODING APPARATUS

[75] Inventor: Harris A. Quesnell, Jr., San Diego, Calif.

[73] Assignee: The United States of America as represented by the Secretary of the Navy, Washington, D.C.

[21] Appl. No.: 155,281

[22] Filed: Jun. 2, 1980

[51] Int. Cl.³ .......................................... H03K 13/175
[52] U.S. Cl. ..................................... 375/87; 329/104; 360/40; 360/44
[58] Field of Search .................. 375/55,84,87, 95, 110, 375/119; 360/40, 43, 44; 329/50, 104

[56] References Cited
U.S. PATENT DOCUMENTS 4,167,760  9/1979  Decker .................................... 360/40
4,260,952  4/1981  Thomas ................................. 360/43

Primary Examiner—Benedict V. Safourek
Assistant Examiner—Stephen Chin
Attorney, Agent, or Firm—Richard S. Sciascia; Ervin F. Johnston; Terrance A. Meador

[57] ABSTRACT

An apparatus for decoding a Manchester encoded waveform is described in which a gating circuit responds to the mid-cell transitions in the encoded waveform to produce an enabling signal which causes a clock circuit to generate high frequency clock pulses. A programmable counter accumulates the generated clock pulses. If the counter exceeds a clock count threshold set by a multiposition switch before the beginning of the following enabling signal, it causes a storage element to sample the encoded waveform and store the sample to provide an output signal representing decoded data. A second, substantially equivalent circuit decodes timing from the encoded waveform. The multiposition switch provides the apparatus with the capability to decode encoded waveforms of varying frequency.

13 Claims, 3 Drawing Figures

MANCHESTER CODE DECODING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a wholly digital apparatus for decoding data and timing components from an encoded Manchester II waveform.

A commonly used digital encoding technique is the Manchester II code in which data and data clock components are combined into a single encoded waveform. The encoded Manchester II waveform is divided into time units of equal duration commonly called data cells during which one binary digit (bit) of information is conveyed. The state of the bit is indicated by a transition in the waveform occurring at the center or mid-cell point of the data cell. The direction of the transition indicates the value of the bit. At least one signal transition per data cell occurs, providing a component in the frequency domain centered at the data clock rate which is twice the bit occurrence rate. The Manchester II code is also known as the biphase, phase-shift, or split-phase code.

The prior art contains a variety of circuit methods directed toward decoding Manchester-type data. Among these, three stand out: phase-locked-loop variations, masking circuits, and matched-filter circuits.

In the phase-locked-loop circuit variations, a voltage-controlled oscillator is synchronized with the clock frequency of the encoded data and used to provide a reference input to a phase comparator. The phase comparator detects phase shifts in the encoded data which provides a basis for decoding the data. An example of this technique is found in U.S. Pat. No. 4,167,760, "Bi-Phase Decoder Apparatus and Method," issued to D. G. Decker, Sept. 11, 1979.

In the masking method, significant transitions in the encoded waveform are used to trigger a multivibrator into a masking state which persists for a length of time sufficient to mask a succeeding nonsignificant transition in the encoded waveform.

Both the phase-locked-loop and masking circuit techniques rely for normal operation upon clear, sharp waveform transitions for triggering various circuit functions. Consequently, they are sensitive to distortions in the waveforms such as pulse-spreading and jitter.

The matched filter circuit approach utilizes a technique known as integrate-and-dump in which a matched filter with a rectangular impulse response is discharged just after its output peaks. Timing for such circuits is commonly provided by a voltage-controlled oscillator which is synchronized with the input data clock. As the input data clock increases in frequency the operational quality of these circuits declines. Synchronization becomes difficult and the time required for discharging begins to intrude upon the time available for integration. Consequently, matched filter decoders are limited in the frequency range over which they can operate.

SUMMARY OF THE INVENTION

The invention utilizes all-digital circuitry and an independent clock to perform its decoding functions. No synchronization between the data rate and the clock is required. The digital circuitry performs high-speed operations required for the integrate-and-dump functions at high data rates. As a result, stable operation over a broad frequency range is achieved.

The invention is an apparatus for decoding a Manchester II encoded waveform and includes a pulse-width gate which is responsive to the encoded waveform and coupled to receive a signal representing previously decoded data for providing, at each mid-cell transition in the encoded waveform, an enabling signal representative of pulse-widths contained in the encoded waveform. A clock generator is coupled to the pulse-width gate and responsive to the enabling signal for providing an oscillatory clock having a frequency exceeding the frequency of the encoded waveform. A programmable counter is coupled to the clock and accumulates the clock pulses. If the accumulated count exceeds a predetermined threshold set by a manual switch, a phase shift is detected and the counter produces a command signal. A sampling device is coupled to the counter and responds to the command signal by sampling the encoded waveform and storing the sample to provide a signal representing data decoded from the encoded waveform. The stored signal is provided to the pulse-width gate for use in producing the enabling signal.

STATEMENT OF THE OBJECTS OF THE INVENTION

An object of this invention is to provide a Manchester decoding apparatus which utilizes a fixed, invariable clock source which is not dependent upon the frequency of the encoded waveform.

Another object of this invention is to provide a simple, high-speed apparatus which utilizes pulse-width gating to implement a fully digital integrate-and-dump decoder.

A still further object of this invention is to provide a fully digital Manchester code decoding apparatus which provides decoded data in a nonreturn-to-zero format together with a decoded timing waveform.

Other objects, advantages and novel features of the invention will become apparent from the following detailed description of the invention when considered in conjunction with the accompanying drawings.

DESCRIPTION OF THE PREFERRED EMBODIMENT

Figure 3:
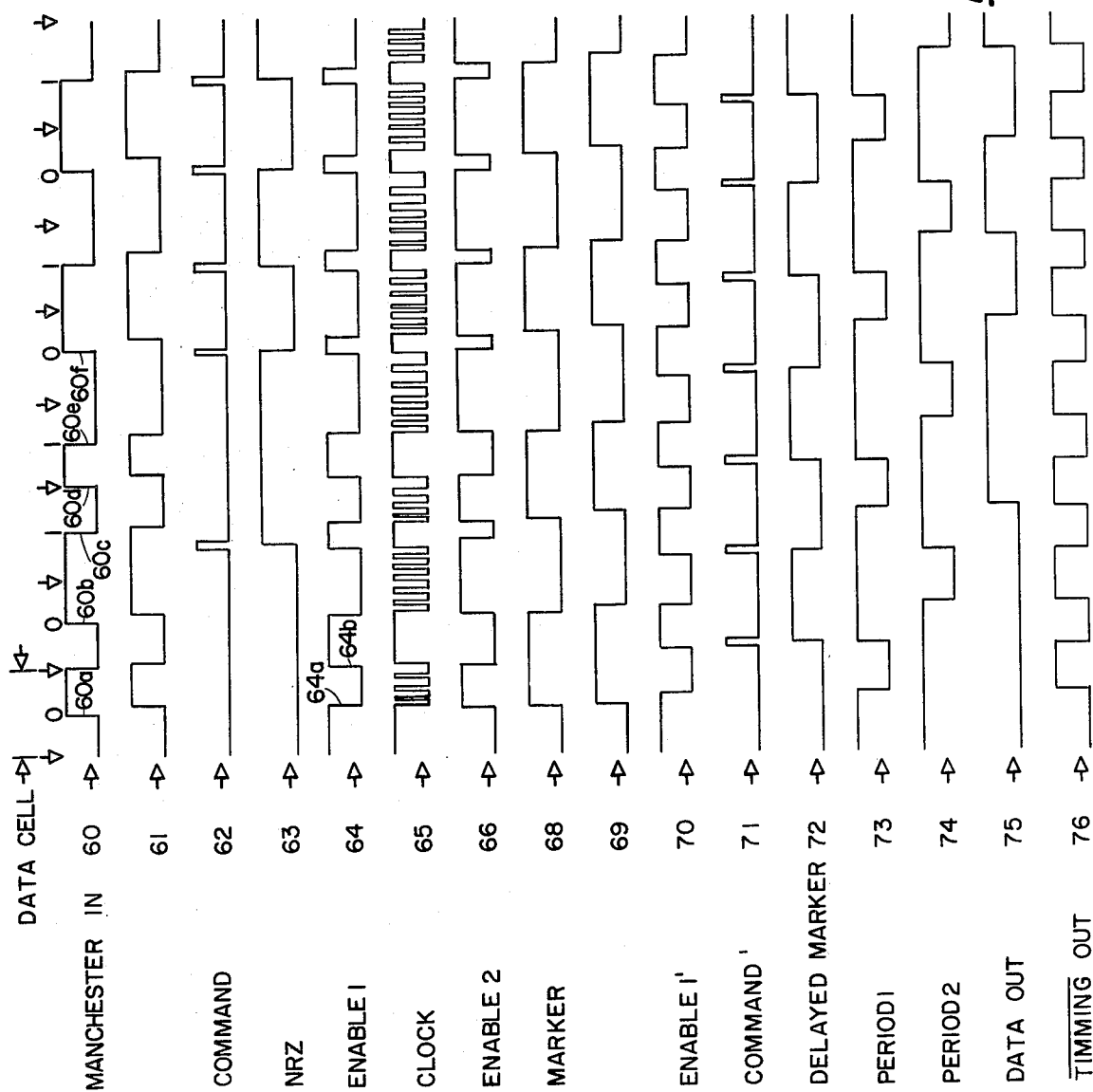
FIG. 3 is an illustration of typical waveforms appearing at various points in FIG. 1.

Manchester II is a commonly used technique to encode digital data. A Manchester encoded waveform is illustrated in FIG. 3 as waveform 60. The encoded waveform is characterized by consecutive data cells of equal time duration during which the waveform undergoes one significant transition between two states, for example, transition 60a. The transition, called the mid-cell transition, occurs at the center of each bit cell. The direction of the transition indicates the value of the encoded bit. Another transition occurs at the border between data cells containing bits of equal value, for example, transition 60d. Successive bits of equal value result in a square-wave of a given phase. Successive bits of opposite value result in a phase shift of the waveform and an apparent elongation of the squared portions of the waveform, for example, the waveform sections between transitions 60b and 60c, and between 60e and 60f. The characteristic elongations associated with the change in value of the encoded data provide the basis for the operation of the invention.

Figure 1:
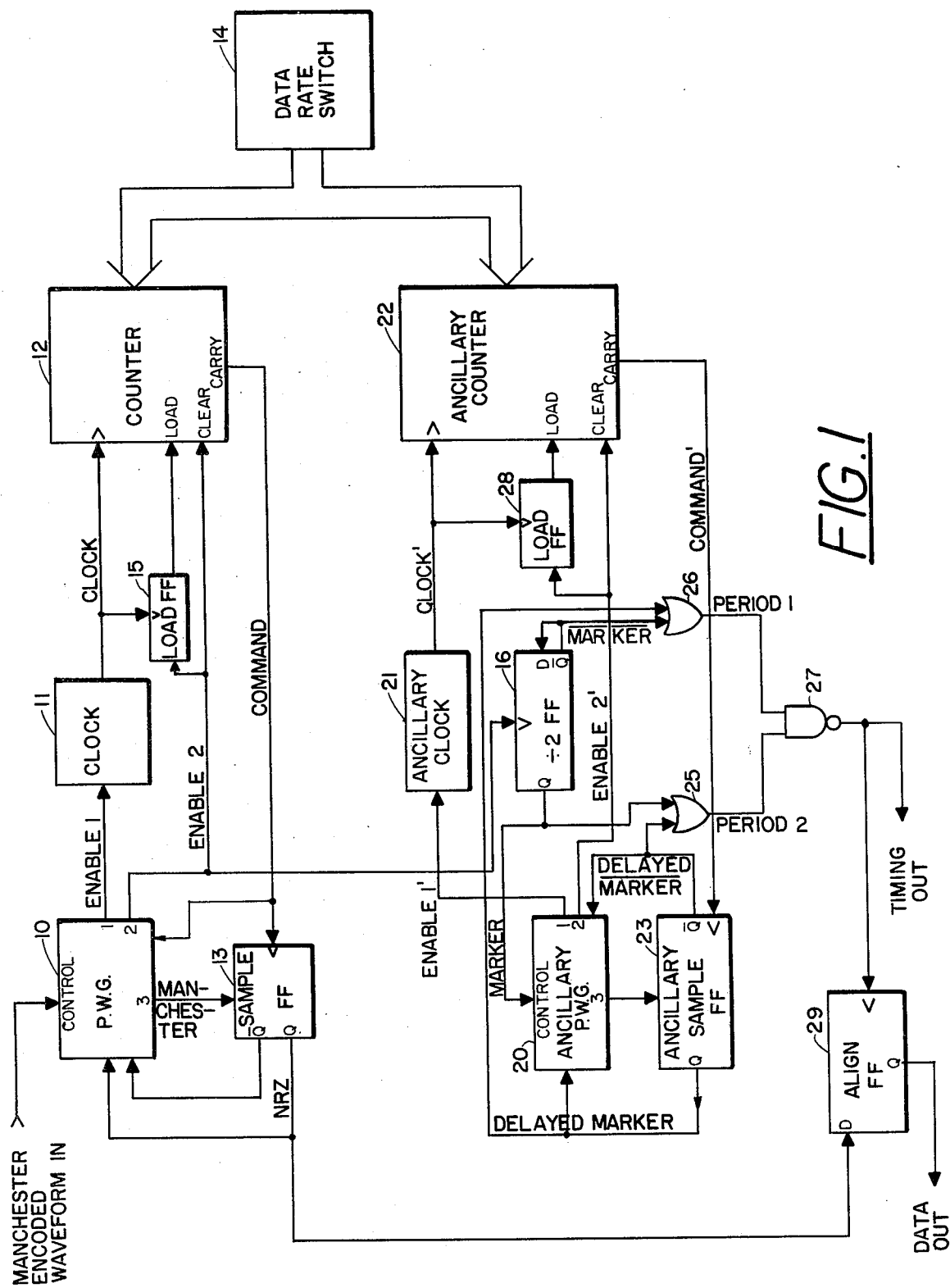
FIG. 1 is a block diagram of the decoding apparatus.

With reference now to FIG. 1, there is illustrated a pulse-width gate 10 coupled to receive a Manchester encoded waveform such as represented by waveform 60 in FIG. 3. The Q and $\overline{Q}$ outputs of a sample flip-flop 13 are also coupled into pulse-width gate 10 where they are combined with the Manchester encoded waveform in a manner described hereinbelow to produce two enabling signals. The first enabling signal, on output 1 of the gate 10, is coupled to a gated clock 11. The output of the clock 11 is coupled into the timing input of programmable counter 12. The second enabling signal, present on output 2 of gate 10, is coupled into the clear input of the programmable counter 12 and also into delay flip-flop 15. The output of delay flip-flop 15 is coupled to the load input of the programmable counter 12. The carry-out output of the programmable counter 12 is connected to the timing input of sample flip-flop 13. The data input of the sample flip-flop 13 is connected to output terminal 3 of the pulse-width gate 10 on which the Manchester encoded waveform is present (waveform 61). A data rate switch 14 has a plurality of parallel outputs for providing a binary code for each of a plurality of switch settings. These outputs are connected in parallel to the preset inputs of programmable counter 12.

With reference now to FIG. 1 and FIG. 3, the data decoding operation of the apparatus illustrated in FIG. 1 can be understood. The Manchester encoded waveform constitutes a control signal used by pulse-width gate 10 to derive the first and second enabling signals, represented by waveforms 64 and 66, respectively, from the data decoded from the Manchester encoded waveform. The decoded data is provided at the Q output of the sample flip-flop 13 in nonreturn-to-zero (NRZ) format, waveform 63. In addition, the pulse-width gate 10 provides the encoded waveform on its output terminal 3 (waveform 61) as a data input for flip-flop 13.

The enabling signals are representative of pulsewidths contained in the encoded waveform. Each also contains information indicating the location of the mid-cell transitions in the encoded waveform. Thus, a negative-going transition in waveform 64, for example, transition 64a, indicates the occurrence of a mid-cell transition in the encoded waveform; the time span to the positive transition 64b represents the pulse-width resulting from the time between a mid-cell transition and the following transition in the encoded waveform. In waveform 66, the second enabling signal, each positive-going transition indicates a mid-cell transition and pulse-width is represented by the distance to the following negative-going transition.

The first enabling signal, waveform 64, establishes a timing gate to turn the clock circuit 11 on with each negative transition and off with each positive transition (waveform 65). The counter 12 accumulates the clock pulses produced by the clock circuit 11, and the length of time that the clock circuit 11 runs determines the magnitude of the count accumulated.

A magnitude threshold is established for the counter 12 by the binary-coded output of data rate switch 14 which is reached only during the occurrence of an elongated pulse. When the threshold is reached, the carry output of the counter 12 is activated producing a command signal represented by waveform 62. Effectively, the counter 12 is a matched filter which identifies the elongated pulses in waveform 60 and stimulates a response described hereinbelow. The relationship between the speed of the clock circuit 11 and the threshold established in the counter 12 determines the length of the pulse to be matched. Since the threshold can be varied by selecting switch settings on data rate switch 14, pulses of various widths may be searched for which gives the apparatus the capability of responding to Manchester encoded waveforms of various frequencies.

A positive transition of the second enabling signal, waveform 66, allows the counter 12 to be cleared at each mid-cell transition. The load flip-flop 15 delays waveform 66 for a half-cycle of the clock signal and then, on the positive transition of the waveform, causes the counter 12 to be loaded with the count selected on data rate switch 14.

The command signal, waveform 62, generated by the carry output of the counter 12, causes the sample flip-flop 13 to sample the current state of waveform 61 during the occurrence of an elongated pulse. Preferably, the counter threshold is selected so that sampling will occur past the half point of an elongated pulse; in the preferred embodiment, the three-quarter point of the elongated pulse is selected. The output of the sample flip-flop 13 thus represents the data decoded from the encoded waveform in NRZ format, waveform 63. Obviously, either the Q or the $\overline{Q}$ output of the sample flip-flop 13 can represent the decoded data depending upon the coding format of the encoded signal. The sample flip-flop 13 changes state only in response to an elongated pulse, that is, when the state of the encoded data changes.

This decoding apparatus offers the advantage of an independent clock which does not rely upon and therefore is not affected by the clock contained in the encoded waveform. This avoids decoding problems associated with clock desynchronization which may be caused by jitter and distortion in the encoded waveform and drift in the decoded clock. In addition, the use of a programmable, digital counter allows the matched-filter characteristic of the decoding apparatus to be conveniently and reliably varied which provides the capability to decode encoded waveforms of various frequencies.

The invention also possesses the capability of decoding the timing contained in the encoded waveform. With reference once again to FIG. 1 and FIG. 3, the timing section of the decoder includes divide-by-two flip-flop 16 connected at its timing input to output terminal 2 of pulse-width gate 10 provided for the second enabling signal. The signal developed by the divide-by-two flip-flop 16, called the marker signal, is present on the Q output of the flip-flop which is connected to the control input of ancillary pulse-width gate 20. The marker signal, waveform 68, has a transition occurring at each mid-cell transition in the encoded waveform. Thus, its frequency is the frequency of occurrence of the data and one half the frequency of the data clock contained in the encoded waveform.

The marker signal is coupled into a decoding circuit which is substantially equivalent to the data decoding circuit described hereinabove. Thus, an ancillary pulse width gate 20 provides as outputs a pair of enabling signals, the first of which (waveform 70) gates an ancillary clock 21. The second enabling signal provides a clear input to an ancillary counter 22 and an input to load flip-flop 28 which develops a load signal for the ancillary counter 22. The ancillary counter 22 is coupled to receive clock pulses from the ancillary clock 21 and also to receive the binary coded switches from data rate switch 14 for setting a magnitude threshold. The carry output of the ancillary counter 22 is coupled to the timing input of an ancillary sample flip-flop 23 which is also coupled to receive as a data input the marker signal which is passed through the ancillary pulse-width gate 20 and provided on output 3 thereof as waveform 69. The Q and $\bar{Q}$ outputs of the sample flip-flop 23 are connected to separate inputs of the pulse-width gate 20.

The difference between the data decoding loop described above and the timing decoding loop is the frequency of the ancillary clock 21 which is selected to be 3/2 the frequency of the clock 11. The ancillary clock 21 is keyed on at each mid-cell transition in the same manner as the clock 11, however, its rate ensures that the ancillary counter 22 will reach the magnitude threshold during each count cycle. Thus, the carry-out will be raised exactly at the mid-point of the marker signal which is the equivalent to the edge of the data cell in the Manchester encoded waveform. The carry-out of the ancillary counter 22 constitutes the command' signal, waveform 71, which causes the sample flip-flop 23 to sample the marker signal (waveform 69) at its mid-point. The marker signal is thereby delayed by the equivalent of one-half of an encoded waveform data cell, waveform 72. The sample flip-flop 23 also provides the complement of the delayed marker as an input to the ancillary pulse-width gate 20.

The complement of the marker signal available at the $\bar{Q}$ output of divide-by-two flip-flop 16 and the delayed marker signal available at the Q output of sample flip-flop 23 are combined at OR gate 26 to provide the first period signal, waveform 73. The waveform 73 is equivalent in the space measured from each positive transition to each negative transition to one-and-one-half data cells in duration. The marker signal provided at the Q output of divide-by-two flip-flop 16 and the delayed marker complement provided at the $\bar{Q}$ output of sample flip-flop 23 are combined in OR gate 25 to produce a second period signal, waveform 74, which is equivalent to the first period signal delayed by the time equivalent of one data cell. The first period signal and the second period signal are combined in NAND gate 27 to produce a timing signal, waveform 76, representing the complement of the data clock contained in the encoded waveform.

The decoded timing and data are aligned in align flip-flop 29 which can be an edge-triggered D flip-flop or equivalent. The D input of the align flip-flop 29 is connected to the Q output of sample flip-flop 13 and the timing input of align flip-flop 29 is connected to the output of NAND gate 27. With this interconnection, the NRZ data decoded from the Manchester encoded waveform is synchronized with the timing signal extracted from the same waveform and the aligned data, waveform 75, is provided on the Q output of aligned flip-flop 29.

Figure 2:
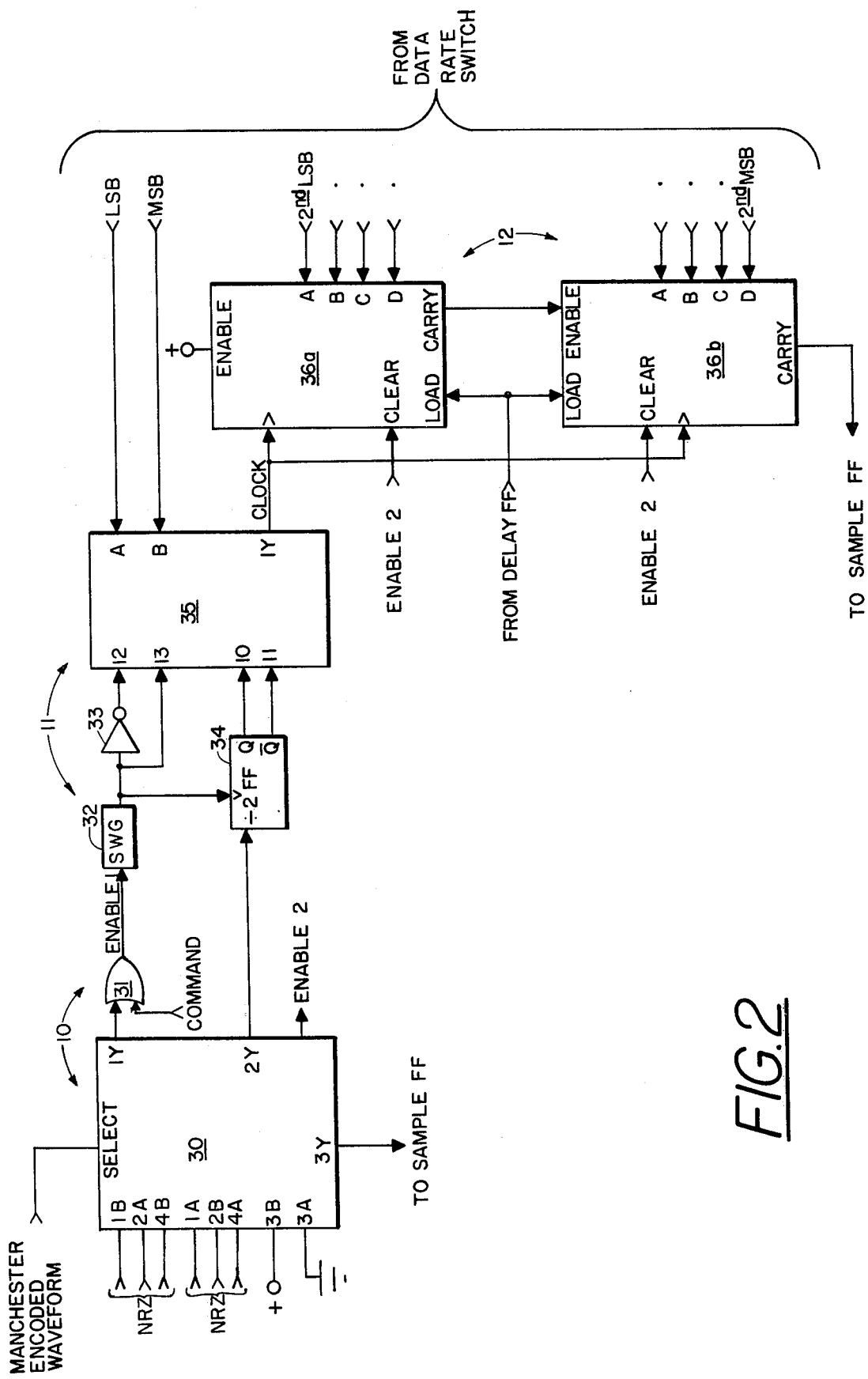
FIG. 2 is a partial schematic of the apparatus illustrated in FIG. 1.

With reference now to FIG. 2, an embodiment of certain elements illustrated in FIG. 1 can be understood.

Pulse-width gate 10 can comprise, for example, a multiplexer 30 and an OR gate 31. The multiplexer 30 can be a quadruple two-line-to-one-line data multiplexer such as the SN74S157 available from Texas Instruments. The Manchester encoded waveform is coupled to the select input of the multiplexer 30 which controls the connection of one of a pair of input terminals with an associated output terminal. In the preferred embodiment, input terminals 1B, 2A and 4B are connected to the Q output of sample flip-flop 13 thus providing the decoded NRZ data as an input. Input terminals 1A, 2B and 4A are connected to the $\bar{Q}$ output of the sample flip-flop 13 thus providing the complement of the NRZ decoded data as an input. Terminal 3A is connected to ground and terminal 3B to a positive source. When the Manchester encoded waveform is in a high state the input terminals with the subscript B are associated with their respective output terminals and the signals present on the B terminals are passed through as outputs. When the Manchester encoded waveform is in the low state the A input terminals are selected and the signals thereon are passed through to their respective output terminals.

One input of OR gate 31 is connected to the 1Y output of the multiplexer 30 and the other input to the carry output of programmable counter 12. This combination produces the first enabling signal on the output of OR gate 31, causing it to rise as soon as the preset threshold in counter 12 is reached. The clock 11 is thereby shut off immediately the threshold is reached.

With reference again to FIG. 2, the clock 11 comprises a square-wave generator 32, an inverter 33, a divide-by-two-flip-flop 34 and a four-line-to-one-line data multiplexer 35. The square-wave generator can be part number TTLSWGN-40, available from Engineering Component Company, San Luis Obispo, Calif. The data multiplexer 35 can be part number SN74S153 available from Texas Instruments.

When the square-wave generator 32 is keyed on by the falling edge of the first enabling signal, it produces a 40 MHz square-wave which is coupled directly to input terminal 13 on multiplexer 35. The 40 MHz clock signal is also connected to the input of inverter 33 which provides the clock's complement to input 12 of multiplexer 35. The divide-by-two flip-flop 34 is coupled to receive the 40 MHz square-wave at its timing input and to receive the output available on terminal 2Y of pulse-width gate 10 at its preset input. The Q output of the flip-flop 34 is connected to input 10 of the multiplexer 35 and the $\bar{Q}$ output to input 11 of the multiplexer 35. When the square-wave generator 32 is keyed on, a 40 MHz clock and its complement are provided on inputs 13 and 12, respectively, of the multiplexer 35 and a 20 MHz clock and its complement on input terminals 10 and 11, respectively, of the multiplexer 35. The particular clock provided to the counter 12 is selected by the signals available at the A and B inputs of multiplexer 35. The selection criteria will be explained in greater detail hereinbelow.

The programmable counter 12 as shown in FIG. 2 comprises two cascaded counters 36A and 36B. A typical device suitable for use in this application is the 74S161 counter available from Texas Instruments. The magnitude threshold is set in the cascaded counter combination by connecting the preset inputs of both counters to selected outputs on the data rate switch 14. The data rate switch can comprise, for example, a manually operated array of bit switches coupled between a source of positive energy and the counter 14. Switch 1 is designated as the LSB and switch 10 as the MSB. Switches 2 through 8 can then provide signals constituting a preset code whose value is determined by the state of the switches.

The LSB and MSB output terminals on the data rate switch 14 are connected to the A and B select inputs, respectively, on multiplexer 35. In the preferred embodiment, the MSB is activated and assumes a positive potential when an encoded waveform with a relatively high data rate is to be decoded. This constrains the 1Y output of the multiplexer 35 to be selected from input terminals 12 or 13 which are coupled to receive the 40 MHz clock. This effectively provides a higher filter sample rate for use with the higher frequency signals. Conversely, the change in the state of the MSB when a lower encoded waveform frequency is selected allows one of the 20 MHz clocks available on input terminals 10 and 11 of the multiplexer 35 to be routed to the 1Y output. The state of the LSB of the data select code at select terminal A selects between the available positive clock or its complement. Thus, the phase of the clock can be more precisely matched to the phase of the encoded waveform.

The circuit illustrated in FIG. 2 for the data decoding loop of the invention also accurately illustrates the timing decoding loop. Thus, the ancillary pulse-width gate 20 can comprise multiplexer 30 and OR gate 31. The ancillary clock 21 can comprise multiplexer 35, inverter 33, and divide-by two flip-flop 34. In the preferred embodiment, the square-wave generator 32 includes in the ancillary clock 21 will comprise a 60 MHz device. Similarly, ancillary counter 22 can comprise programmable counters 36A and 36B.

The decoding circuit described hereinabove is, by virtue of the combination of the counter and variable switch, operable at various frequencies of the encoded waveforms. In practice, the range of frequencies over which the preferred embodiment has operated extends from 30 KHz at its low end to in excess of 20 MHz at its highest extreme.

Obviously, many modifications and variations of the present invention are possible in the light of the above teachings. It is therefore to be understood that within the scope of the appended claims the invention may be practiced otherwise than as specifically described.

What is claimed is:

1. An apparatus for decoding a Manchester encoded waveform containing data and timing components, comprising:
    gating means responsive to the encoded waveform and coupled to receive a signal representing data decoded from the encoded waveform for providing, at each mid-cell transition in the encoded waveform, a first enabling signal and a second enabling signal, each enabling signal representing pulse widths contained in the encoded waveform;
    means coupled to receive the first enabling signal and responsive thereto for providing a primary clock signal having a frequency exceeding the frequency of the encoded waveform;
    means coupled to the clock means for counting clock oscillations and coupled to receive the second enabling signal and responsive thereto for producing a command signal upon reading a predetermined clock count magnitude;
    means coupled to receive the command signal and responsive thereto for sampling the state of the encoded waveform and for storing the sample to provide a signal representing data decoded from the encoded waveform.

2. An apparatus as in claim 1 further including variable means coupled to the counting means for providing a clock count magnitude.

3. An apparatus as in claim 2, further including:
    means coupled to receive the second enabling signal for producing a marker signal and its complement, the marker signal indicating the mid-cell transitions of the encoded waveform;
    circuit means coupled to receive the marker signal and its complement for producing a first period signal representing a time period exceeding the time period of a data cell in the encoded waveform and for producing a second period signal representing the first period signal delayed by a time duration not exceeding the duration of a data cell; and
    means coupled to receive the first and second period signals for combining them to provide a signal representing timing decoded from the encoded waveform.

4. An apparatus as in claim 3 wherein the circuit means comprises:
    ancillary gating means responsive to the marker signal and coupled to receive signals representing a delayed marker signal and its complement for providing an ancillary enabling signal representing the mid-cell transitions in the encoded waveform;
    ancillary clock means coupled to receive the ancillary enabling signal and responsive thereto for providing an ancillary clock signal having a frequency exceeding the primary clock frequency;
    ancillary means coupled to the clock means for counting ancillary clock oscillations and for producing an ancillary command signal upon reaching the predetermined clock count magnitude;
    means coupled to receive the command signal and responsive thereto for sampling the state of the marker signal and for storing the sample to provide a signal representing the delayed marker signal and its complement;
    first logic means for combining the marker and delayed marker complement signals to produce the first period signal; and
    second logic means for combining the complement marker and delayed marker signals to produce the second period signal.

5. An apparatus as in claim 4 further comprising means responsive to the decoded data signal and to the decoded timing signal for synchronizing the decoded signals.

6. An apparatus as in claim 5 wherein the synchronizing means comprises an edge-triggered D flip-flop.

7. An apparatus as in claim 2 wherein the variable means comprises a manual switching apparatus having a plurality of switch combinations and an output for providing a coded signal associated with a respective combination.

8. An apparatus as in claim 7 wherein the gating means comprises a multiplexer having a selection input operably connected to a source of the encoded waveform, having a plurality of separate pairs of input terminals, and having a plurality of output terminals, each output terminal associated with a respective pair of input terminals, the selection input determining which one of each terminal pair will be routed to its associated output terminal.

9. An apparatus as in claim 8 wherein the clock means comprises:

a means responsive to the first enabling signal for generating an oscillatory full-clock waveform and its complement;

an edge-triggered flip-flop operably clocked by the oscillatory waveform and connected to produce an oscillatory half-clock waveform and its complement each having one-half the frequency of the full clock waveform; and means responsive to the variable means for selecting a respective clock waveform wherein the selected clock waveform is provided to the counting means.

10. An apparatus as in claim 9, further including:

means coupled to receive the second enabling signal for producing a marker signal and its complement, the marker signal indicating the mid-cell transition of the encoded waveform;

circuit means coupled to receive the marker signal and its complement for producing a first period signal representing a time period exceeding the time period of a data cell in the encoded waveform and for producing a second period signal representing the first period signal delayed by a time duration not exceeding the duration of a data cell; and means coupled to receive the first and second period signals for combining them to provide a signal representing timing decoded from the encoded waveform.

11. An apparatus as in claim 9, wherein the circuit means comprises:

ancillary gating means responsive to the marker signal and coupled to receive signals representing a delayed marker signal and its complement for providing an ancillary enabling signal representing the mid-cell transitions in the encoded waveform;

ancillary clock means coupled to receive the ancillary enabling signal and responsive thereto for providing an ancillary oscillatory clock signal having a frequency exceeding the frequency of the primary clock frequency;

ancillary means coupled to the clock means for counting ancillary clock oscillations and for producing an ancillary command signal upon reaching the predetermined clock count magnitude;

means coupled to receive the marker signal and responsive to the ancillary command signal for producing the delayed marker signal and its complement;

first logic gating means for combining the marker and delayed marker complement signals to produce the first period signal; and second logic gating means for combining the complement marker and delayed marker signals to produce the second period signal.

12. An apparatus as in claim 11 comprising means responsive to the decoded signal and to the decoded timing signal for synchronizing the decoded signals.

13. An apparatus as in claim 12 wherein the synchronizing means comprises an edge-triggered D flip-flop.

* * * * *